US009896564B2

(12) United States Patent
Korzhenko et al.

(10) Patent No.: US 9,896,564 B2
(45) Date of Patent: Feb. 20, 2018

(54) USE OF CARBON-BASED NANOFILLERS AT A VERY LOW CONTENT FOR THE UV STABILIZATION OF COMPOSITE MATERIALS

(71) Applicant: Arkema France, Colombes (FR)

(72) Inventors: Alexander Korzhenko, Pau (FR); Patrick Delprat, Lescar (FR); Catherine Bluteau, Pau (FR); Andriy Tymoshenko, Pau (FR); Anatoliy Goryachkin, Pau (FR); Dmitry Zakharov, Pau (FR)

(73) Assignee: ARKEMA FRANCE, Colombes (FR)

( * ) Notice: Subject to any disclaimer, the term of this patent is extended or adjusted under 35 U.S.C. 154(b) by 376 days.

(21) Appl. No.: 14/405,068

(22) PCT Filed: Jun. 3, 2013

(86) PCT No.: PCT/FR2013/051246
§ 371 (c)(1),
(2) Date: Dec. 2, 2014

(87) PCT Pub. No.: WO2013/182794
PCT Pub. Date: Dec. 12, 2013

(65) Prior Publication Data
US 2015/0118430 A1    Apr. 30, 2015

Related U.S. Application Data

(60) Provisional application No. 61/667,725, filed on Jul. 3, 2012.

(30) Foreign Application Priority Data

Jun. 4, 2012    (FR) ...................... 12 55186

(51) Int. Cl.
| | |
|---|---|
| C08J 3/22 | (2006.01) |
| C08K 3/04 | (2006.01) |
| C08K 7/24 | (2006.01) |
| C08L 23/02 | (2006.01) |
| C08L 23/06 | (2006.01) |
| C08J 5/18 | (2006.01) |

(52) U.S. Cl.
CPC .................... *C08K 3/04* (2013.01); *C08J 3/22* (2013.01); *C08J 3/226* (2013.01); *C08J 5/18* (2013.01); *C08K 7/24* (2013.01); *C08L 23/02* (2013.01); *C08L 23/06* (2013.01); *C08J 2321/00* (2013.01); *C08J 2323/06* (2013.01); *C08J 2423/06* (2013.01); *Y10T 428/139* (2015.01); *Y10T 442/642* (2015.04)

(58) Field of Classification Search
CPC ..... C08J 3/22; C08J 3/226; C08J 5/18; C08K 3/04; C08K 7/24
USPC .................. 523/351, 495, 496; 524/495, 496
See application file for complete search history.

(56) References Cited

U.S. PATENT DOCUMENTS

| | | |
|---|---|---|
| 2003/0158323 A1 | 8/2003 | Connell et al. |
| 2003/0213939 A1 | 11/2003 | Narayan et al. |
| 2004/0152806 A1 | 8/2004 | Koga et al. |
| 2004/0211942 A1 | 10/2004 | Clark et al. |
| 2004/0234445 A1 | 11/2004 | Serp et al. |
| 2005/0029498 A1 | 2/2005 | Elkovitch et al. |
| 2005/0038225 A1 | 2/2005 | Charati et al. |
| 2006/0112512 A1 | 6/2006 | McNeil |
| 2007/0129481 A1 | 6/2007 | Yamaguchi et al. |
| 2008/0312364 A1 | 12/2008 | Piccione et al. |
| 2010/0078600 A1 | 4/2010 | Connell et al. |
| 2010/0084618 A1 | 4/2010 | Connell et al. |
| 2010/0178477 A1 | 7/2010 | Jacobs |
| 2010/0201023 A1 | 8/2010 | Piccione et al. |
| 2010/0243965 A1 | 9/2010 | Korzhenko et al. |
| 2010/0264376 A1 | 10/2010 | Korzhenko et al. |
| 2011/0121241 A1 | 5/2011 | Bordere et al. |
| 2011/0201731 A1 | 8/2011 | Korzhenko et al. |
| 2011/0292502 A1 | 12/2011 | Meyer et al. |
| 2011/0293921 A1 | 12/2011 | Meyer et al. |
| 2011/0301282 A1 | 12/2011 | Magni |

FOREIGN PATENT DOCUMENTS

| | | |
|---|---|---|
| EP | 1719804 A1 | 11/2006 |
| EP | 1777259 A1 | 4/2007 |
| EP | 1 980 530 A1 | 10/2008 |

(Continued)

OTHER PUBLICATIONS

International Search Report (PCT/ISA/210) dated Sep. 16, 2013, by the European Patent Office as the International Searching Authority for International Application No. PCT/FR2013/051244.
Written Opinion (PCT/ISA/237) dated Sep. 16, 2013, European by the French Patent Office as the International Searching Authority for International Application No. PCT/FR2013/051244.
Written Opinion (PCT/ISA/237) dated Sep. 27, 2013, by the European Patent Office as the International Searching Authority for International Application No. PCT/FR2013/051246.
Martin-Gullon et al., "Differences between carbon nanofibers produced using Fe and Ni catalysts in a floating catalyst reactor," Carbon 44, 2006, pp. 1572-1580.

(Continued)

Primary Examiner — Edward J Cain
(74) Attorney, Agent, or Firm — Buchanan Ingersoll & Rooney P.C.

(57) ABSTRACT

The use of very low concentrations of carbon nanofillers selected from among carbon nanotubes, carbon nanofibers, graphene or a mixture of same in any proportions, in order to improve resistance to ageing, in particular protection against ultraviolet (UV) light, of a composite material based on a polymer matrix. A composite product comprising a composite material, the composite material stabilized with respect to UV light using a content of between 1 ppm and 0.1% by weight, of carbon-based nanofillers chosen from carbon nanotubes, carbon nanofibers, graphene or a mixture of these in all proportions, wherein the composite product is selected from yarns, films, tubes, fibers, and nonwovens.

11 Claims, No Drawings

(56) References Cited

FOREIGN PATENT DOCUMENTS

| | | |
|---|---|---|
| EP | 1 995 274 A1 | 11/2008 |
| EP | 2 236 556 A1 | 10/2010 |
| JP | 2003-286350 A | 10/2003 |
| JP | 2007-126578 A | 5/2007 |
| JP | 2007-238793 A | 9/2007 |
| JP | 2011-173957 A | 9/2011 |
| KR | 2009 0065111 A | 6/2009 |
| WO | WO 03/002456 A2 | 1/2003 |
| WO | WO 03/040026 A2 | 5/2003 |
| WO | WO 03/085681 A1 | 10/2003 |
| WO | WO 2004/097852 A1 | 11/2004 |
| WO | WO 2005/015574 A1 | 2/2005 |
| WO | WO 2005/044865 A2 | 5/2005 |
| WO | WO 2010/046606 A1 | 4/2010 |
| WO | WO 2010/109118 A1 | 9/2010 |
| WO | WO 2010/109119 A1 | 9/2010 |
| WO | WO 2011/141366 A1 | 11/2011 |
| WO | WO 2011/141369 A1 | 11/2011 |

OTHER PUBLICATIONS

Flahaut et al., "Gram-scale CCVD synthesis of double-walled carbon nanotubes," Chem Comm. 2003, pp. 1442-1443.
Korzhenko et al., U.S. Appl. No. 14/405,069, entitled "Composite Material Having a Very Low Content of Carbon-Based Nanofillers, Process for the Preparation Thereof and Uses Thereof," filed in the U.S. Patent and Trademark Office on Dec. 2, 2014.
International Search Report (PCT/ISA/210) dated Sep. 27, 2013, by the French Patent Office as the International Searching Authority for International Application No. PCT/FR2013/051246.
Written Opinion (PCT/ISA/237) mailed on , by the Patent Office as the International Searching Authority for International Application No. PCT/FR2013/051246.

USE OF CARBON-BASED NANOFILLERS AT A VERY LOW CONTENT FOR THE UV STABILIZATION OF COMPOSITE MATERIALS

FIELD OF THE INVENTION

The present invention relates to the use of very low contents of carbon-based nanofillers, in particular of carbon nanotubes, for improving the resistance to ageing, in particular the protection with regard to ultraviolet (UV) light, of a composite material based on a polymer matrix.

STATE OF THE ART

Carbon nanotubes (or CNTs) are known and have specific crystalline structures, of hollow and closed tubular form, obtained from carbon. CNTs generally consist of one or more graphite sheets arranged concentrically around a longitudinal axis. A distinction is thus made between Single Wall Nanotubes (SWNTs) and Multi-Wall Nanotubes (MWNTs).

CNTs are commercially available or can be prepared by known methods. Several processes exist for the synthesis of CNTs, in particular electrical discharge, laser ablation and Chemical Vapour Deposition (CVD). This CVD process consists specifically in injecting a carbon source at relatively high temperature onto a catalyst which can consist of a metal, such as iron, cobalt, nickel or molybdenum, supported on an inorganic solid, such as alumina, silica or magnesia. The carbon sources can comprise methane, ethane, ethylene, acetylene, ethanol, methanol, indeed even a mixture of carbon monoxide and hydrogen.

From a mechanical point of view, CNTs exhibit both an excellent stiffness (measured by the Young's modulus), comparable to that of steel, while being extremely light. In addition, they exhibit excellent electrical and thermal conductivity properties which make it possible to envisage using them as additives for conferring these properties on various materials, in particular macromolecular materials, such as thermoplastic polymers, elastomers and other thermosetting polymers.

However, CNTs prove to be difficult to handle and to disperse, due to their small size, their dusty nature and possibly, when they are obtained by the CVD technique, their entangled structure, all the more so when it is desired to increase their mass productivity for the purposes of improving the production and of reducing the residual ash content. The existence of strong Van der Waals interactions between the nanotubes is also harmful to the dispersibility thereof and to the stability of the composite materials obtained.

The poor dispersibility of CNTs has a significant effect on the characteristics of the composites which they form with the polymer matrices into which they are introduced. The appearance is observed in particular of nanocracks, which are formed at aggregates of nanotubes and which result in the composite becoming embrittled. Furthermore, insofar as CNTs are poorly dispersed, it is necessary to increase their content in order to achieve the desired properties.

To this end, CNTs are used mainly for their electrical properties today at a relatively high content, generally greater than 0.5% by weight.

Given the technical difficulties in incorporating CNTs in polymeric matrices, their effects have not been fully explored.

In order to overcome the poor dispersibility of CNTs, which is capable of significantly affecting the characteristics of the polymeric matrices into which they are introduced, various solutions have been proposed in the state of the art. Mention may be made, among these, of sonication, which however only has a temporary effect, or ultrasonication, which has the effect of in part cutting the nanotubes and of creating oxygen-comprising functional groups which can affect some of their properties, or mention may also be made of techniques for grafting or functionalizing the CNTs which, however, exhibit the disadvantage of generally being carried out under aggressive conditions capable of damaging, indeed even destroying, the nanotubes.

More recently, the latest developments have related to the preparation of masterbatches comprising carbon nanotubes at high contents, efficiently and homogeneously dispersed on industrial scale, in a polymeric matrix, based on a thermoplastic polymer, an elastomer or a thermosetting resin. Mention may be made, for example, of the documents on behalf of the Applicant Company which describe such preparation processes, EP 1 995 274; WO 2010/046606; WO 2010/109118 and WO 2010/109119.

These masterbatches, comprising a high content of carbon nanotubes, can subsequently be easily handled and then diluted in polymer matrices to form completely homogeneous composite materials having a low CNT content which are intended for the manufacture of composite parts.

Surprisingly, it has now been discovered that the incorporation of carbon-based nanofillers, such as carbon nanotubes, in a polymer matrix at an extremely low content, of less than 0.1% by weight, makes it possible to improve the stabilization thereof, in particular the protection against ultraviolet (UV) light, while retaining good mechanical properties. Under these conditions, it has been found that carbon-based nanofillers, such as carbon nanotubes, advantageously replace carbon black in order to avoid the degradation of mechanical properties which is associated with the UV ageing of composite materials.

This is because the protection of plastic materials with regard to degradation by UV radiation is generally obtained by adding appropriate additives, such as antioxidants, typical agents for protecting against UV radiation (that is to say, HALS), and often carbon black.

Carbon black is thus one of the most widely used and most effective agents for stabilization with respect to UV light for certain applications of plastics (tubes, films for agriculture, telecommunications cable sheaths, and the like).

To this end, polymer matrices have carbon black added to them, generally at contents which can range from one to a few %, in order to protect against ageing the composite materials and the objects produced from these polymer matrices.

In document US 2006/112512, it has been proposed to incorporate carbon nanotubes at a content ranging from 0.1% to 1% into elastomer-based compositions in order to improve the resistance thereof to UV degradation. However, according to this document, it is necessary to add fullerenes thereto in order to obtain the desired effect.

An aim of the present invention is to replace carbon black with carbon-based nanofillers, such as carbon nanotubes, at markedly lower contents, of the order of 50 times lower than the normal contents of carbon black, in order to protect composite materials based on polymer matrices against ageing which is associated with exposure to UV radiation.

SUMMARY OF THE INVENTION

More specifically, a subject-matter of the invention is the use of carbon-based nanofillers for improving the resistance to ageing with regard to UV light of a composite material comprising a polymeric composition, characterized in that the content of carbon-based nanofillers is between 1 ppm and 0.1% by weight, with respect to the composite material.

According to the invention, the carbon-based nanofillers are chosen from carbon nanotubes, carbon nanofibres, graphene or a mixture of these in all proportions.

According to the invention, the composite material thus stabilized does not comprise aggregates of carbon-based nanofillers with a size of greater than 10 μm. Furthermore, the UV stabilization of the polymeric composition is not carried out at the expense of the mechanical or thermo-mechanical properties or the properties related to the industrial processability of this composition. On the contrary, it has been found that at least one of these properties can be improved during UV stabilization using carbon-based nanofillers.

The invention also applies to the use of a composite material stabilized with respect to UV light using a content of between 1 ppm and 0.1% by weight of carbon-based nanofillers in the manufacture of various composite products, such as yarns, films, tubes, fibres, nonwovens, such as fabrics or felts, which products can be used for optical fibre conduits, machining of cables, waste or industrial water or gas pipes, extruded or moulded coatings, articles manufactured by injection moulding, extrusion, compression or moulding, in the motor vehicle sector (parts under the bonnet, external or internal parts, leak tightness, and the like) or in the field of agriculture, in particular for protecting agricultural land (greenhouse and soils).

The stabilized composite material according to the invention can advantageously be converted into transparent film which is resistant to UV radiation, for example film with a thickness ranging from 10 μm to 50 μm and which absorbs at least 5% of the UV, visible or IR light in transmission, in comparison with nonabsorbing materials which are not stabilized by carbon-based nanofillers.

DETAILED DESCRIPTION

The Carbon-Based Nanofillers

According to the invention, the carbon-based nanofillers are chosen from carbon nanotubes, carbon nanofibres, graphene or a mixture of these in all proportions.

The carbon nanotubes can be of the single wall, double wall or multi-wall type. The double wall nanotubes can be prepared in particular as described by Flahaut et al. in Chem. Comm. (2003), 1442. The multi-wall nanotubes can for their part be prepared as described in the document WO 03/02456. Preference is given, according to the invention, to multi-wall carbon nanotubes obtained according to a chemical vapour deposition (or CVD) process, by catalytic decomposition of a carbon source (preferably of vegetable origin), such as described in particular in Application EP 1 980 530 of the Applicant Company.

The nanotubes usually have a mean diameter ranging from 0.1 to 100 nm, preferably from 0.4 to 50 nm and better still from 1 to 30 nm, indeed even from 10 to 15 nm, and advantageously a length from 0.1 to 10 μm. Their length/diameter ratio is preferably greater than 10 and generally greater than 100. Their specific surface is, for example, between 100 and 300 m$^2$/g, advantageously between 200 and 300 m$^2$/g, and their bulk density can in particular be between 0.05 and 0.5 g/cm$^3$ and more preferably between 0.1 and 0.2 g/cm$^3$. The multi-wall nanotubes can, for example, comprise from 5 to 15 sheets (or walls) and more preferably from 7 to 10 sheets. These nanotubes may or may not be treated.

An example of crude carbon nanotubes is in particular commercially available from Arkema under the trade name Graphistrength® C100.

These nanotubes can be purified and/or treated (for example oxidized) and/or functionalized before they are employed in the process according to the invention.

The nanotubes can be purified by washing with a solution of sulphuric acid, so as to free them from possible residual inorganic and metallic impurities, such as, for example, iron originating from the process for the preparation thereof. The ratio by weight of the nanotubes to the sulphuric acid can be in particular be between 1:2 and 1:3. The purification operation can furthermore be carried out at a temperature ranging from 90 to 120° C., for example for a time of 5 to 10 hours. This operation can advantageously be followed by stages of rinsing with water and of drying the purified nanotubes. In an alternative form, the nanotubes can be purified by a heat treatment at a high temperature, typically of greater than 1000° C.

The oxidation of the nanotubes is advantageously carried out by brining the latter into contact with a sodium hypochlorite solution including from 0.5 to 15% by weight of NaOCl and preferably from 1 to 10% by weight of NaOCl, for example in a ratio by weight of the nanotubes to the sodium hypochlorite ranging from 1:0.1 to 1:1. The oxidation is advantageously carried out at a temperature of less than 60° C. and preferably at ambient temperature, for a time ranging from a few minutes to 24 hours. This oxidation operation can advantageously be followed by stages of filtering and/or centrifuging, washing and drying the oxidized nanotubes.

The nanotubes can be functionalized by grafting reactive units, such as vinyl monomers, to the surface of the nanotubes. The constituent material of the nanotubes is used as radical polymerization initiator after having been subjected to a heat treatment at more than 900° C., in an anhydrous and oxygen-free medium, which is intended to remove the oxygen-comprising groups from its surface. It is thus possible to polymerize methyl methacrylate or hydroxyethyl methacrylate at the surface of carbon nanotubes with a view to facilitating in particular the dispersion thereof in PVDF.

Use may be made, in the present invention, of crude nanotubes, that is to say nanotubes which are neither oxidized nor purified nor functionalized and which have not been subjected to any other chemical and/or heat treatment. In an alternative form, use may be made of purified nanotubes, in particular purified by heat treatment at high temperature. Furthermore, it is preferable for the carbon nanotubes not to have been milled.

The carbon nanofibres are, like the carbon nanotubes, nanofilaments produced by chemical vapour deposition (or CVD) from a carbon-based source which is decomposed on a catalyst comprising a transition metal (Fe, Ni, Co, Cu), in the presence of hydrogen, at temperatures from 500 to 1200° C. However, these two carbon-based fillers differ in their structure (I. Martin-Gullon et al., Carbon, 44 (2006) 1572-1580). This is because carbon nanotubes consist of one or more graphene sheets wound concentrically around the axis of the fibre to form a cylinder having a diameter of 10 to 100 nm. In contrast, carbon nanofibres are composed of relatively organized graphitic regions (or turbostratic stacks), the planes of which are inclined at variable angles with respect to the axis of the fibre. These stacks can take the form of platelets, fish bones or dishes stacked in order to form structures having a diameter generally ranging from 100 nm to 500 nm, indeed even more.

Preference is given to the use of carbon nanofibres having a diameter from 100 to 200 nm, for example of approximately 150 nm (VGCF® from Showa Denko), and advantageously a length from 100 to 200 µm.

The term "graphene" denotes a flat, isolated and separate sheet of graphite but also, by extension, an assembly comprising between one sheet and several tens of sheets and exhibiting a flat or relatively undulating structure. Each sheet of graphene is formed of carbon atoms bonded to one another via C—C bonds of $sp^2$ type, forming a two-dimensional hexagonal network.

Generally, the graphene used in the invention is provided in the form of solid particles of nanometric size exhibiting a thickness of less than 15 nm and at least one lateral dimension substantially perpendicular to the said thickness of between 0.1 µm and 500 µm, and comprising from 1 to 50 sheets, the said sheets being capable of being detached from one another in the form of independent sheets, for example during a treatment with ultrasound.

According to a preferred embodiment of the invention, the carbon-based nanofillers comprise carbon nanotubes, preferably multi-wall carbon nanotubes obtained according to a chemical vapour deposition process, alone or as a mixture with graphene.

According to a preferred embodiment of the invention, the carbon-based nanofillers are used at a content of between 10 ppm and 0.075% by weight, with respect to the composite material.

It is possible to add other conventional stabilizers to the carbon-based nanofillers in order to reinforce the UV-stabilizing effect of the carbon-based nanofillers.

The Polymeric Composition

According to the invention, the polymeric composition comprises a polymer matrix including at least one polymer which can be a thermoplastic polymer or an elastomeric resin base or a mixture of these in all proportions.

According to a first embodiment of the invention, the polymeric composition includes a thermoplastic polymer. The term "thermoplastic polymer" is understood to mean, within the meaning of the present invention, a polymer which melts when it is heated and which can be shaped and reshaped in the molten state.

This thermoplastic polymer can be chosen in particular from: homo- and copolymers of olefins, such as polyethylene, polypropylene, polybutadiene, polybutylene and acrylonitrile-butadiene-styrene copolymers; acrylic homo- and copolymers and poly(alkyl (meth)acrylate)s, such as poly(methyl methacrylate); homo- and copolyamides; polycarbonates; polyesters, including poly(ethylene terephthalate) and poly(butylene terephthalate); polyethers, such as poly(phenylene ether), poly(oxymethylene) and poly(oxyethylene) or poly(ethylene glycol); polystyrene; copolymers of styrene and maleic anhydride; poly(vinyl chloride); fluoropolymers, such as poly(vinylidene fluoride), polytetrafluoroethylene and polychlorotrifluoroethylene; natural or synthetic rubbers; thermoplastic polyurethanes; polyaryletherketones (PAEKs) such as polyetheretherketone (PEEK) and polyetherketoneketone (PEKK); polyetherimide; polysulphone; poly(phenylene sulphide); cellulose acetate; poly(vinyl acetate); and their blends.

According to one embodiment, the polymer is chosen from homo- and copolymers of olefins, in particular homo- and copolymers of ethylene or propylene, and homo- and copolymers of amides, such as polyamide 6, 6.6, 6.10, 6.12, 11, 12, 10.10, 12.12, 4.6, or copolymers with olefins or esters, ethers or phenolic compounds.

In a second embodiment of the invention, the polymeric composition includes an elastomeric resin base. The term "elastomeric resin base" is understood to mean, in the present description, an organic or silicone polymer which forms, after vulcanization, an elastomer capable of withstanding high strains in a virtually reversible fashion, that is to say liable to be subjected to a uniaxial strain, advantageously of at least twice its original length, at ambient temperature (23° C.) for five minutes, and then of recovering, once the stress has been released, its initial size, with a residual strain of less than 10% of its initial size.

From the structural viewpoint, elastomers generally consist of polymeric chains connected to one another to form a three-dimensional network. More specifically, thermoplastic elastomers, in which the polymeric chains are connected to one another via physical bonds, such as hydrogen or dipole-dipole bonds, are sometimes distinguished from thermosetting elastomers, in which these chains are connected via covalent bonds, which constitute chemical crosslinking points. These crosslinking points are formed by vulcanization processes employing a vulcanization agent which can, for example, be chosen, depending on the nature of the elastomer, from sulphur-based vulcanization agents, in the presence of dithiocarbamate metal salts; zinc oxides combined with stearic acid; bifunctional phenol/formaldehyde resins which are optionally halogenated, in the presence of tin chloride or zinc oxide; peroxides; amines; hydrosilanes in the presence of platinum; and the like.

The present invention relates more particularly to the elastomeric resin bases including or consisting of thermosetting elastomers, optionally as a mixture with unreactive elastomers, that is to say nonvulcanizable elastomers (such as hydrogenated rubbers).

The elastomeric resin bases which can be used according to the invention can in particular comprise, indeed even consist of, one or more polymers chosen from: fluorocarbon or fluorosilicone elastomers; homo- and copolymers of butadiene, optionally functionalized by unsaturated monomers, such as maleic anhydride, (meth)acrylic acid, acrylonitrile (NBR) and/or styrene (SBR; SBS; SEBS); neoprene (or polychloroprene); polyisobutylene (FIB); polyisopropylene (PIP); polyisoprene; copolymers of isoprene with styrene, butadiene, acrylonitrile and/or methyl methacrylate; copolymers based on propylene and/or ethylene and in particular terpolymers based on ethylene, propylene and dienes (EPDM), and also the copolymers of these olefins with an alkyl (meth)acrylate or vinyl acetate; natural rubbers (NR); halogenated butyl rubbers; silicone elastomers, such as poly(dimethylsiloxane)s having vinyl ends; polyurethanes (PUs); plastomers comprising $C_4$, $C_5$, $C_6$, $C_8$, $C_9$ or $C_{12}$ olefins; polyesters; acrylic polymers, such as poly(butyl acrylate) carrying carboxylic acid or epoxy functional groups; and their modified or functionalized derivatives and their blends, without this list being limiting.

It is preferable to use, according to the invention, the elastomeric resins EPDM, SBR, SBS, SEBS, NBR, NR, FIB, PIP or PU, or the $C_4$, $C_5$, $C_6$, $C_8$, $C_9$ or $C_{12}$ plastomers, or their blends in all proportions.

According to a preferred embodiment of the invention, the polymeric composition comprises at least one thermoplastic polymer.

Other Constituents

In addition to the abovementioned constituents, according to the invention, the composite material comprising a polymeric composition can comprise other additives, in particular chosen from nonpolymeric additives or polymeric additives.

The nonpolymeric additives optionally included in the composite material according to the invention comprise in particular nonpolymeric plasticizers, surfactants, such as sodium dodecylbenzenesulphonate, inorganic fillers, such as silica, titanium dioxide, talc or calcium carbonate, UV screening agents, in particular based on titanium dioxide, flame retardants, solvents for the polymer, heat or light stabilizers, in particular based on phenol or phosphite, and their mixtures.

Mention may be made, as polymeric additives, of dispersing or plasticizing polymers, in particular dispersing polymers which improve the dispersion of the nanofillers in the polymer matrix.

The chemical nature of the dispersant depends on the chemical nature of the polymer matrix to be reinforced by the carbon-based nanofillers. Mention may be made, for example, as dispersants, of cyclic butylene terephthalate oligomers (in particular the CBT® 100 resin from Cyclics), natural waxes, synthetic waxes, polyolefin waxes, fatty acids and their derivatives, esters/amides, saponified fatty acids, zinc stearate, sorbitan esters of acids, glycerol ester, derivatives of organic acids, the organic portion of organosilanes, such as aminosilane, (Struktol® SCA 1100) chloropropylsilane (Struktol® SCA 930), epoxysilane (Struktol® SCA 960), methacryloyloxysilane (Struktol® SCA 974) or vinylsilanes (Struktol® SCA 971 and SCA 972), grafted polymers (Polymer-G-MAH, Polymer-G-GMA), titanates and zirconates (Tyzor), silsesquioxane oligomers (POSS), branched additives and polymers sold under the names Boltorn H20, H30, H40, H20, H30, H40, S 1200, D 2800, P/S80 1200, DEO750 8500, H 1500, H/S80 1700, HV 2680, P 1000, PS 1925, PS 2550, H311, H2004, P500, P1000, W3000, U3000, and others, DSM Hybrane), BYK-C 8000 from Byk Company, and the like.

A process for the preparation of a composite material comprising a polymeric composition and carbon-based nanofillers which is stabilized with respect to UV light according to the present invention will now be described in more detail.

This process comprises at least the following stages:

a) the introduction into and then kneading in a compounding device of a masterbatch concentrated in carbon-based nanofillers, with a polymeric matrix, in order to obtain a precomposite comprising from 0.25% to 3% by weight of carbon-based nanofillers;

b) optionally the conversion of the precomposite in the agglomerated solid form, such as granules or milled powder;

c) the introduction of the precomposite into a polymer matrix including at least one polymer chosen from a thermoplastic polymer and an elastomeric resin base or a blend of these in all proportions, in order to obtain a composite material.

This process comprises a first stage a) of dilution of a masterbatch concentrated in carbon-based nanofillers in a polymeric matrix for the purpose of obtaining a precomposite comprising from 0.25% to 3% by weight of carbon-based nanofillers.

The term "masterbatch concentrated in carbon-based nanofillers" is understood to mean a masterbatch including from 5% to 50% by weight of carbon-based nanofillers, in particular carbon nanotubes, dispersed in a polymeric matrix based on a thermoplastic polymer, on an elastomer resin base and/or on a dispersing polymer.

Mention may be made, among the masterbatches which can be used, for example, of the Graphistrength® CM grades of the Applicant Company, available commercially, in particular the CM 12-30, CM 13-30, CM 1-20, CM 2-20, CM 3-20, CM 6-20 and CM 7-20 grades.

The diluting stage can be carried out by kneading in a compounding device and results directly in a precomposite comprising from 0.25% to 3% by weight of carbon-based nanofillers.

In an alternative form, the diluting stage is carried out in at least two successive stages, in order to refine the dispersion, the first resulting in a precomposite comprising from 2.5% to 10% by weight, preferably from 2.5% to 5% by weight, of carbon-based nanofillers and the second resulting in a precomposite comprising from 0.25% to 3% by weight of carbon-based nanofillers.

According to this alternative form, it is possible to accurately attain very low contents of nanofillers in the dispersion, while avoiding the risk of agglomeration of the carbon-based nanofillers within the dispersion.

The term "compounding device" is understood to mean, in the present description, an appliance conventionally used in the plastics industry. In this appliance, the polymeric composition and the masterbatch are blended using a high shear device, for example an extruder comprising corotating or counterrotating twin screws or a co-kneader.

Examples of co-kneaders which can be used according to the invention are the Buss® MDK 46 co-kneaders and those of the Buss® MKS or MX series, sold by Buss AG, which all consist of a screw shaft provided with flights, which is positioned in a heating barrel optionally consisting of several parts, the internal wall of which is provided with kneading teeth capable of interacting with the flights to produce shearing of the kneaded material. The shaft is rotated, and provided with an oscillatory movement in the axial direction, by a motor. These co-kneaders can be equipped with a system for the manufacture of granules, for example fitted to their outlet orifice, which can consist of an extrusion screw or a pump.

The co-kneaders which can be used according to the invention preferably have a screw L/D ratio ranging from 7 to 22, for example from 10 to 20, while the corotating extruders advantageously have a L/D ratio ranging from 15 to 56, for example from 20 to 50.

Use may be made, as compounding device, in particular in the case where the polymeric matrix is based on a solid elastomer resin base, of a roll (two- or three-roll) mixer or mill.

According to stage a) of the process according to the invention, the introduction, into the compounding device, of the concentrated masterbatch and of the polymeric matrix can be carried out in various ways, either simultaneously in two separate introduction means or successively in one and the same feed zone of the mixer.

The polymeric matrix can be of the same nature as the polymeric matrix constituting the concentrated masterbatch. In an alternative form, the concentrated masterbatch comprises a dispersant and the polymeric matrix can be different from the polymeric matrix constituting the concentrated masterbatch.

On conclusion of stage a), the precomposite can be optionally converted in an agglomerated solid physical from, for example in the form of granules, or of milled powder, or in the form of rods, a strip or a film (stage b).

According to stage c) of the process according to the invention, the precomposite is introduced into a polymer matrix including at least one polymer chosen from a thermoplastic polymer and an elastomer resin base, such as described above.

Stage c) can be carried out using any conventional device, in particular using internal mixers or roll (two- or three-roll) mixers or mills. The amount of precomposite introduced into the polymer matrix depends on the content of the carbon-based nanofillers which it is desired to add to this matrix for the purpose of obtaining the mechanical properties desired for the composite material obtained.

This polymer matrix comprises at least one polymer, which can be identical to (or different from) that or those used in the manufacture of the masterbatch or in the preparation of the precomposite, and optionally various additives, for example lubricants, pigments, stabilizing agents, fillers or reinforcing agents, antistatic agents, fungicides, flame-retardant agents, solvents, blowing agents, rheology modifiers and their mixtures.

The composite material obtained can be formed according to any appropriate technique, in particular by injection moulding, extrusion, compression or moulding, followed by a vulcanization or crosslinking treatment in the case where the polymeric matrix comprises an elastomeric resin base.

In an alternative form, the introduction of precomposite into the polymer matrix according to stage c) can be carried out dry, directly into the machine for forming the composite material, such as a injection moulding device.

The resistance to ageing with regard to UV light of the composite material obtained according to the invention can be monitored by the determination of its mechanical properties after exposure to UV radiation for more than one month.

The presence of carbon-based nanofillers at a content as low as 1 ppm to 0.1% by weight additionally makes it possible to obtain an effect comparable to the standard effect obtained with markedly greater contents of carbon black, in terms of intrinsic coloration.

A better understanding of the invention will be obtained in the light of the following nonlimiting and purely illustrative examples.

EXAMPLES

Example 1: Effect of the CNTs on the UV Stabilization of Polyethylene

A masterbatch (MB) comprising 2.5% of Graphistrength C100 CNT, produced by Arkema, in HDPE, HMA 018 polyethylene from Exxon-Mobil was prepared. The mixture was prepared by compounding in a Clextral BC21 twin-screw extruder.

The properties of this masterbatch (MB) are shown in Table 1.

TABLE 1

|  | MB |
| --- | --- |
| CNT (%) | 2.5 |
| HDPE, HMA 018 (%) | 97.5 |
| MFI 190° C., 2.16 kg (g/10 min) | 18 |
| Tensile strength at the yield point, 50 mm/min (MPa) | 22 |
| Tensile strength at the yield point, 100 mm/min (MPa) | 23 |
| Ultimate strength, 50 mm/min (MPa) | 12 |
| Ultimate strength, 100 mm/min (MPa) | 11 |
| Elongation at break, 50 mm/min (%) | 180 |
| Elongation at break, 100 mm/min (%) | 120 |

The masterbatch MB was diluted in MDPE 3802 polyethylene from Total Petrochemicals, dry, under the same compounding conditions for the purpose of preparing 2 composite materials comprising 2% and 4% of masterbatch MB, e.g. consequently 2 composite materials including 0.05% and 0.1% of CNT.

The mechanical properties (Standard NF A 49-110, rate of elongation 100 mm/min) were evaluated on the 2 composite materials before and after exposure to UV radiation.

Exposure to UV radiation was carried out on 1 BA dumbbells, dimensions 10×2 mm, cut out according to Standard ISO 527-2

Irradiation source: Xenon lamp (according to Standard NF T 51-056)

Irradiation intensity: 60±5 W/m$^2$

Filter: Xenochrome 300, wavelength 300-400 nm

Temperature of the black background: 50±5° C.

Relative humidity: 45±10%

Duration of exposure: 800 hours.

The samples were conditioned at ambient temperature for 48 h before carrying out the tensile measurements.

By way of comparison, samples of MDPE 3802, MDPE 3802 B (MDPE 3802 with the addition of 2-2.5% of carbon black) and HDPE 4206 B (HDPE 4206 with the addition of 2-2.5% of carbon black) polyethylene originating from Total Petrochemicals were subjected to the same test conditions.

The combined results appear in Table 2.

TABLE 2

|  |  | MDPE 3802 (reference) | MDPE 3802 B | HDPE 4206 B | MDPE 3802 + 2% MB | MDPE 3802 + 4% MB |
| --- | --- | --- | --- | --- | --- | --- |
| Carbon black, % |  | 0 | 2.0-2.5 | 2.0-2.5 | 0 | 0 |
| CNT, % |  | 0 | 0 | 0 | 0.05 | 0.1 |
| Tensile strength at the yield point (MPa) | Before exposure to UV radiation | 18 | 16 | 19 | 16 | 16 |
|  | After exposure to UV radiation | 8 | 20 | 24 | 20 | 20 |
| Ultimate strength (MPa) | Before exposure to UV radiation | 23 | 24 | 22 | 23 | 17 |

TABLE 2-continued

|  |  | MDPE 3802 (reference) | MDPE 3802 B | HDPE 4206 B | MDPE 3802 + 2% MB | MDPE 3802 + 4% MB |
|---|---|---|---|---|---|---|
|  | After exposure to UV radiation | 21 | 28 | 30 | 28 | 27 |
| Elongation at break, (%) | Before exposure to UV radiation | 680 | 750 | 690 | 720 | 520 |
|  | After exposure to UV radiation | 6 | 670 | 650 | 650 | 640 |
| Change in the elongation at break, (%) |  | −99 | −10 | −6 | −10 | +23 |

These tests have shown that the base medium-density polyethylene MDPE 3802 has completely lost its mechanical properties after exposure to UV radiation for 800 hours.

The commercial grades MDPE 3802 B and HDPE 4206 B, stabilized with carbon black, exhibit a similar behaviour with a satisfactory stability towards UV radiation.

The incorporation of 0.05% of CNT in the base MDPE 3802 results in a similar UV stabilization to that obtained with the 2-2.5% of carbon black present in the commercial grade MDPE 3802 B.

The MDPE 3802 with the addition of 0.1% of CNT exhibits initial mechanical properties in terms of strength and elongation at break which are inferior to those of the MDPE 3802 B but regains properties equivalent to those of the MDPE 3802 B after exposure to UV radiation for 800 hours.

Example 2: Effect of the CNTs on the Coloration of a Polyethylene

The Graphistrength C M4-30 masterbatch from Arkema was diluted in polyethylene, MDPE grade, in a twin-screw extruder in several stages in order to obtain a composition comprising 0.25% of CNT. This composition was metered dry directly into the injection moulding machine, resulting in composites with different contents of CNT.

Coloration determinations were carried out by reflection at an angle of 10°, according to Standard ISO 12-647. At very low contents, of less than 0.01%, in particular ranging from 5 ppm to less than 100 ppm, the CNTs can be used as black pigments.

In the following Table 3, the parameter L corresponds to the lightness of the product (L=0, black product, L=100, white product) and the parameters a and b are close to 0 for black products.

TABLE 3

|  | CNT content, % | | | | |
|---|---|---|---|---|---|
|  | 0 ref. MDPE | 0.001 | 0.005 | 0.01 | 0.05 |
| L | 85.36 | 59.08 | 33.93 | 28.08 | 24.5 |
| a | −2.1 | −0.05 | −0.31 | −0.36 | −0.2 |
| b | 1.7 | 2.94 | −0.01 | −0.25 | 0.08 |

The invention claimed is:

1. A method for improving the resistance to ageing with regard to UV light of a composite material comprising a polymeric composition, the method comprising:
kneading a masterbatch comprising a carbon-based nanofiller to form a pre-composite material comprising from about 0.25% to about 3% by weight of the carbon-based filler relative to the total weight of the pre-composite material, the carbon-based nanofiller selected from the group consisting of carbon nanotubes, carbon nanofibres, graphene, and mixtures thereof;
optionally, converting the pre-composite material to an agglomerated form; and
introducing the pre-composite material into a polymer matrix to form the composite material, the composite material having a content of the carbon-based nanofillers between 1 ppm and 0.1% by weight relative to the total weight of the composite material,
wherein the UV resistance is monitored by determination of the mechanical properties of the composite material after exposure to UV radiation for one month.

2. The method according to claim 1, wherein the carbon-based nanofillers are carbon nanotubes, alone or as a mixture with graphene.

3. The method according to claim 1, wherein the polymeric composition comprises a polymer matrix including at least one polymer selected from the group consisting of a thermoplastic polymer, an elastomeric resin base and mixtures thereof.

4. The method according to claim 3, wherein the thermoplastic polymer is selected from the group consisting of homo- and copolymers of olefins; acrylic homo- and copolymers and poly(alkyl (meth)acrylate)s; homo- and copolyamides; polycarbonates; polyesters; polyethers; polystyrene; copolymers of styrene and maleic anhydride; poly(vinyl chloride); fluoropolymer; natural or synthetic rubbers; thermoplastic polyurethanes; polyaryletherketones (PAEKs); polyetherimide; polysulphone; poly(phenylene sulphide); cellulose acetate; poly(vinyl acetate); and mixtures thereof.

5. The method according to claim 3, wherein the polymer matrix includes the elastomeric resin base, wherein the elastomeric resin base is selected from the group consisting of fluorocarbon or fluorosilicone elastomers; homo- and copolymers of butadiene, optionally functionalized by unsaturated monomers; neoprene (or polychloroprene); polyisobutylene (PIB); polyisopropylene (PIP); polyisoprene; copolymers of isoprene with styrene, butadiene, acrylonitrile and/or methyl methacrylate; copolymers based on propylene and/or; natural rubbers (NR); halogenated butyl rubbers; silicone elastomers; polyurethanes (PUs); plastomers comprising $C_4$, $C_5$, $C_6$, $C_8$, $C_9$ or $C_{12}$ olefins; polyesters; acrylic polymers; and their modified or functionalized derivatives, and mixtures thereof.

6. A composite product made by the method of claim 1, wherein the composite product is selected from yarns, films, tubes, fibres, and nonwovens.

7. The composite product according to claim 6, wherein the composite product is a film comprising a content of between 10 ppm and 0.075% by weight of carbon-based nanofillers, said film having a thickness ranging from 10 μm to 50 μm and absorbing at least 5% of the UV, visible or IR light in transmission.

8. The method according to claim 2, wherein the polymeric composition comprises a polymer matrix including at least one polymer selected from the group consisting of a thermoplastic polymer, an elastomeric resin base and mixtures thereof.

9. The method according to claim 1, wherein the converting the pre-composite material to an agglomerated form is included in the method and the agglomerated form is selected from the group consisting of granules and powders in the form of a rod, a strip or a film.

10. A method for improving the resistance to ageing with regard to UV light of a composite material comprising a polymeric composition, the method comprising:

kneading a masterbatch comprising a carbon-based nanofiller to form a pre-composite material comprising from about 0.25% to about 3% by weight of the carbon-based filler relative to the total weight of the pre-composite material, the carbon-based nanofiller selected from the group consisting of carbon nanotubes, carbon nanofibres, graphene, and mixtures thereof;

converting the pre-composite material to an agglomerated form; and introducing the pre-composite material into a polymer matrix to form the composite material, the composite material having a content of the carbon-based nanofillers between 1 ppm and 0.1% by weight relative to the total weight of the composite material.

11. The method according to claim 10, wherein the agglomerated form is selected from the group consisting of granules and powders in the form of a rod, a strip or a film.

* * * * *